(12) United States Patent
Wei

(10) Patent No.: US 10,250,405 B2
(45) Date of Patent: Apr. 2, 2019

(54) ADVERTISEMENT MANAGEMENT OF INTERNET COMMUNICATION WITH DEVICES ON A MOBILE PLATFORM

(71) Applicant: United Bus Technology Inc., McLean, VA (US)

(72) Inventor: Tong Wei, McLean, VA (US)

(*) Notice: Subject to any disclaimer, the term of this patent is extended or adjusted under 35 U.S.C. 154(b) by 6 days.

(21) Appl. No.: 15/341,665

(22) Filed: Nov. 2, 2016

(65) Prior Publication Data
US 2018/0124239 A1 May 3, 2018

(51) Int. Cl.
*H04M 3/42* (2006.01)
*H04L 12/40* (2006.01)
*G06Q 30/02* (2012.01)
*H04W 88/02* (2009.01)
*H04W 84/12* (2009.01)

(52) U.S. Cl.
CPC ......... *H04L 12/40* (2013.01); *G06Q 30/0241* (2013.01); *H04W 84/12* (2013.01); *H04W 88/02* (2013.01)

(58) Field of Classification Search
CPC . H04L 63/0281; H04L 67/2842; H04L 67/02; H04L 67/28; H04W 8/245; H04W 4/18; H04W 4/20; H04N 21/6125; H04N 21/8586; H04N 21/2387; H04N 21/2183
See application file for complete search history.

(56) References Cited

U.S. PATENT DOCUMENTS

| | | | |
|---|---|---|---|
| 2007/0010195 A1* | 1/2007 | Brown | H04H 60/73 455/3.06 |
| 2008/0042912 A1* | 2/2008 | Lee | H04L 12/4641 343/713 |
| 2012/0117183 A1* | 5/2012 | Wong | H04L 63/101 709/217 |
| 2012/0154265 A1* | 6/2012 | Kim | G06F 21/84 345/156 |

* cited by examiner

*Primary Examiner* — Quan M Hua

(57) ABSTRACT

Disclosed herein is a system comprising: a networking device, a storage, and a proxy server, wherein the proxy server is configured to identify a first group of contents from first data received from a content server, to modify the first data to generate second data by replacing the first group of contents with labels, and to transmit the second data to the networking device; wherein the networking device is configured to read the labels in the second data, to request contents from the storage based on the labels, to replace the labels with the contents received from the storage to generate third data, to transmit the third data to a mobile device.

18 Claims, 14 Drawing Sheets

Fig. 2

ADVERTISEMENT MANAGEMENT OF INTERNET COMMUNICATION WITH DEVICES ON A MOBILE PLATFORM

TECHNICAL FIELD

The disclosure herein relates to apparatuses, methods and systems for managing advertisement, in particular advertisement in Internet communication with mobile devices (e.g., smart phones and tablets) on a mobile platform (e.g., a bus).

BACKGROUND

Before the early 2000's, Internet communication was primarily with stationary devices (e.g., desktop computers). In the last ten years, Internet communication with mobile devices (e.g., smart phones, tablets) increased exponentially. Mobile devices enabled many new applications of the Internet and increased the demand for constant Internet access.

In response to this demand, the transportation industry deployed systems that allow their passengers to access the Internet during transit. One type of these systems connects the passengers to the Internet through cellular networks. These systems may be suitable for mobile platforms (e.g., buses and trains) that typically travel through space with cellular networks coverage. Another type of these systems connects the passengers to the Internet through satellites. These systems may be suitable for mobile platforms (e.g., planes and cruise ships) that typically travel through space without cellular networks coverage. However, both cellular networks and satellites are usually metered transmission channels and the cost of communication often depends on the amount of communication transmitted through these channels.

SUMMARY

Disclosed herein is a system comprising: networking device, a storage, and a proxy server, wherein the proxy server is configured to identify a first group of contents from first data received from a content server, to modify the first data to generate second data by replacing the first group of contents with labels, and to transmit the second data to the networking device; wherein the networking device is configured to read the labels in the second data, to request contents from the storage based on the labels, to replace the labels with the contents received from the storage to generate third data, to transmit the third data to a mobile device.
  According to an embodiment, the mobile device and the networking device are on a same mobile platform.
  According to an embodiment, the mobile platform is a bus.
  According to an embodiment, the mobile device is selected from a group consisting of a smart phone, a tablet, a game console, a mobile hotspots, another networking device, and a fixture on a mobile platform.
  According to an embodiment, the networking device is selected from a group consisting of gateways, routers, network bridges, modems, wireless access points, switches, hubs, and repeaters, proxy servers, firewalls, network address translators, multiplexers, network interface controllers, wireless network interface controller and a combination thereof.
  According to an embodiment, the networking device is configured to communicate with the mobile device through a wireless local area network (WLAN).
  According to an embodiment, the networking device comprises one or more cellular modems, or one or more satellite modems.
  According to an embodiment, the networking device is configured to communicate with a communication infrastructure.
  According to an embodiment, the communication infrastructure comprises a cellular network or a satellite.
  According to an embodiment, the networking device is configured to cause data transmitted to the communication infrastructure to be routed to the proxy server.
  According to an embodiment, the storage is configured to provide a content stored therein to the networking device at a request of the networking device.
  According to an embodiment, the proxy server is configured to cause data received from a content server to be routed to the networking device.
  According to an embodiment, the proxy server is configured to identify the first group of contents based on parameters selected in a group consisting of an address of a content server, a type of the contents, formats of the contents, spatial locations of the contents, temporal locations of the contents, structures of the first data, executable codes related to the contents, and a combination thereof.
  According to an embodiment, the labels are smaller in size than the first group of contents.
  According to an embodiment, the labels represent characteristics of the first group of contents, the characteristics selected from a group consisting of subject matters of the first group of contents, spatial locations of the first group of contents, temporal locations of the first group of contents, colors of the first group of contents, spatial sizes of the first group of contents, temporal sizes of the first group of contents, and a combination thereof.
Disclosed herein is a server comprising: a content identification unit, a content characteristics determination unit, a label generation unit, and a label insertion unit, wherein the content identification unit is configured to identify a first group of contents in first data received from a content server, separate from a second group of contents from the first data; wherein the content characteristics determination unit is configured to determined one or more characteristics of the first group of contents, based on the first group of contents, the second group of contents, or a combination thereof; wherein the label generation unit is configured to generate labels that represent the characteristics; wherein the label insertion unit is configured to combine the second group of contents and the labels.
  According to an embodiment, the content identification unit is configured to identify the first group of contents based on a set of rules and parameters of the first data.
  According to an embodiment, the parameters are selected from a group consisting of an address of the content server, a type of the first group of contents, formats of the first group of contents, spatial locations of the first group of contents, temporal locations of the first group of contents, structures of the first data, executable codes related to the first group of contents, and a combination thereof.
  According to an embodiment, the rules comprise a machine learning model.
  Disclosed herein is a networking device comprising: a label identification unit, a local content retrieval unit, and a content insertion unit, wherein the label identification unit is configured to identify labels that represent a first group of contents, separate from a second group of contents, in data received by the networking device; wherein the local content retrieval unit is configured to request a third group of contents from a storage, based on the labels; wherein the content insertion unit is configured to combine the second group of contents and the third group of contents to generate other data, and to transmit the other data to a mobile device.

According to an embodiment, the storage and the networking device are on a same mobile platform.

According to an embodiment, the mobile platform is a bus.

Disclosed herein is a system comprising: a networking device, and a storage, wherein networking device is configured to identify a first group of requests for first contents from first data received from a mobile device, to modify the first data to generate second data by modifying or removing the first group of requests, and to send the second data to a content server through a communication infrastructure; wherein networking device is configured to determine characteristics of the first contents, to request second contents from the storage based on the characteristics, and to include the second contents in third data from the networking device to the mobile device, wherein the second contents satisfy the first group of requests.

According to an embodiment, the mobile device and the networking device are on a same mobile platform.

According to an embodiment, the mobile platform is a bus.

According to an embodiment, the mobile device is selected from a group consisting of a smart phone, a tablet, a game console, a mobile hotspots, another networking device, and a fixture on a mobile platform.

According to an embodiment, the networking device is selected from a group consisting of gateways, routers, network bridges, modems, wireless access points, switches, hubs, and repeaters, proxy servers, firewalls, network address translators, multiplexers, network interface controllers, wireless network interface controller and a combination thereof.

According to an embodiment, the networking device is configured to communicate with the mobile device through a wireless local area network (WLAN).

According to an embodiment, the networking device comprises one or more cellular modems, or one or more satellite modems.

According to an embodiment, the communication infrastructure comprises a cellular network or a satellite.

According to an embodiment, the storage is configured to provide the second content stored therein to the networking device at a request of the networking device.

According to an embodiment, the networking device is configured to identify the first group of requests based on parameters selected in a group consisting of an address of the first contents, a type of the first contents, formats of the first contents, spatial locations of the first contents, temporal locations of the first contents, origin of the first group of requests, and a combination thereof.

According to an embodiment, the characteristics are selected from a group consisting of subject matters of the first contents, spatial locations of the first contents, temporal locations of the first contents, colors of the first contents, spatial sizes of the first contents, temporal sizes of the first contents, and a combination thereof.

Disclosed herein is a networking device comprising: a request identification unit, a content characteristics determination unit, a local content retrieval unit, and a content insertion unit, wherein the request identification unit is configured to identify a first group of requests for first contents from first data received from a mobile device; wherein the content characteristics determination unit is configured to determine characteristics of the first contents; wherein the local content retrieval unit is configured to request a second contents from the storage based on the characteristics, wherein the second contents satisfy the first group of requests; wherein the content insertion unit is configured to include the second contents into data sent to the mobile device.

According to an embodiment, the mobile device and the networking device are on a same mobile platform.

According to an embodiment, the mobile platform is a bus.

According to an embodiment, the mobile device is selected from a group consisting of a smart phone, a tablet, a game console, a mobile hotspots, another networking device, and a fixture on a mobile platform.

According to an embodiment, the networking device is selected from a group consisting of gateways, routers, network bridges, modems, wireless access points, switches, hubs, and repeaters, proxy servers, firewalls, network address translators, multiplexers, network interface controllers, wireless network interface controller and a combination thereof.

According to an embodiment, the networking device is configured to communicate with the mobile device through a wireless local area network (WLAN).

According to an embodiment, the networking device comprises one or more cellular modems, or one or more satellite modems.

According to an embodiment, the storage is configured to provide the second content stored therein to the networking device at a request of the networking device.

According to an embodiment, the networking device is configured to identify the first group of requests based on parameters selected in a group consisting of an address of the first contents, a type of the first contents, formats of the first contents, spatial locations of the first contents, temporal locations of the first contents, origin of the first group of requests, and a combination thereof.

According to an embodiment, the characteristics are selected from a group consisting of subject matters of the first contents, spatial locations of the first contents, temporal locations of the first contents, colors of the first contents, spatial sizes of the first contents, temporal sizes of the first contents, and a combination thereof.

BRIEF DESCRIPTION OF FIGURES

FIG. 2 shows a partial screenshot from a website.

DETAILED DESCRIPTION

Reference will now be made in detail to the embodiments of the present teaching, examples of which are illustrated in the accompanying drawings. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

Not all contents of the Internet communication are valuable to an operator of a mobile platform or its passengers. One example of such contents is advertisements, for example, in web pages and video streams. These advertisements may include a lot of images, videos and sounds, and thus may require larger amounts of communication and cost more to deliver than other contents. These advertisements often originate from entities unrelated to the operator of the mobile platform and thus viewing or responding to these advertisements probably does not contribute to the operator's revenue.

Figure 1:
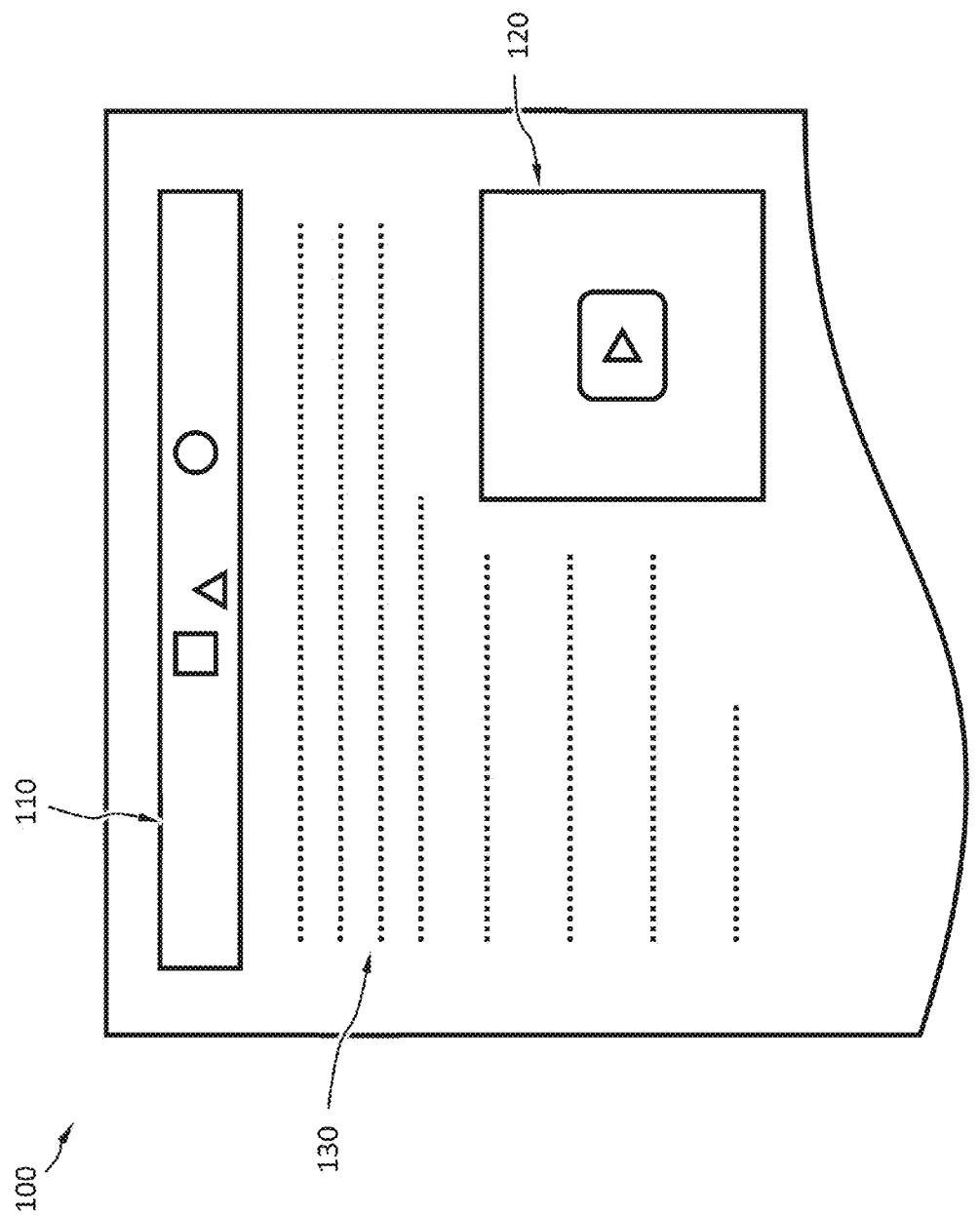
FIG. 1 schematically shows advertisements embedded in a web page as rendered on a mobile device.

FIG. 1 schematically shows advertisements embedded in a web page 100 as rendered on a mobile device. The web page 100 may include textual contents 130, image contents 110 and interactive contents 120 (e.g., videos and Flash). Advertisements in the web page 100 are usually among the image contents 110 and the interactive contents 120, but may be in the textual contents 130. The web page 100 may include other components such as sounds.

The image contents 110 may include images of various formats. The most common format is perhaps JPEG (Joint Photographic Experts Group). The JPEG format may be used to store digital raster images using lossy compression. The degree of compression can be adjusted, allowing a selectable tradeoff between storage size and image quality. JPEG typically achieves 10:1 compression with little perceptible loss in image quality.

Another common format is TIF or TIFF (Tagged Image File Format). The TIFF format is a flexible, adaptable file format. The TIFF format can be a container holding JPEG (lossy), PackBits (lossless) compressed images, and even vector images. The TIFF format is popular among graphic artists, the publishing industry, and photographers because it may compress images losslessly.

The GIF format (Graphics Interchange Format) is another format for losslessly compressed raster images. A notable feature of the GIF format is that it can store simple animations. Multiple images (frames) may be stored in a single GIF file. Each frame may be displayed with a time delay, thus forming a video clip. The GIF format also supports designation of a transparent background color.

Portable Network Graphics (PNG) was designed as a replacement for the GIF format. PNG offers better compression and more features than GIF but does not support animation. PNG is more suitable than GIF in instances where true-color imaging and alpha transparency are required.

Scalable Vector Graphics (SVG) is an XML-based vector image format for two-dimensional graphics with support for interactivity and animation. Vector images use polygons to represent images in computer graphics. Vector images are based on vectors, which lead through locations called control points or nodes. Each of these points may have a definite position and may determine the direction of the path; further, each path may be assigned various attributes, including such values as stroke color, shape, curve, thickness, and fill.

The interactive contents 120 are contents that may respond to a user's actions (e.g., mouse clicks, mouse double clicks, mouse drags, hand touches, hand drag, hand gestures, device orientation changes, etc.) Examples of the interactive contents 120 may include videos and Flash animations. One group of common video formats is the Moving Picture Experts Group (MPEG) formats. The MPEG formats compress video and audio using a variety of complex algorithms.

Figure 2:
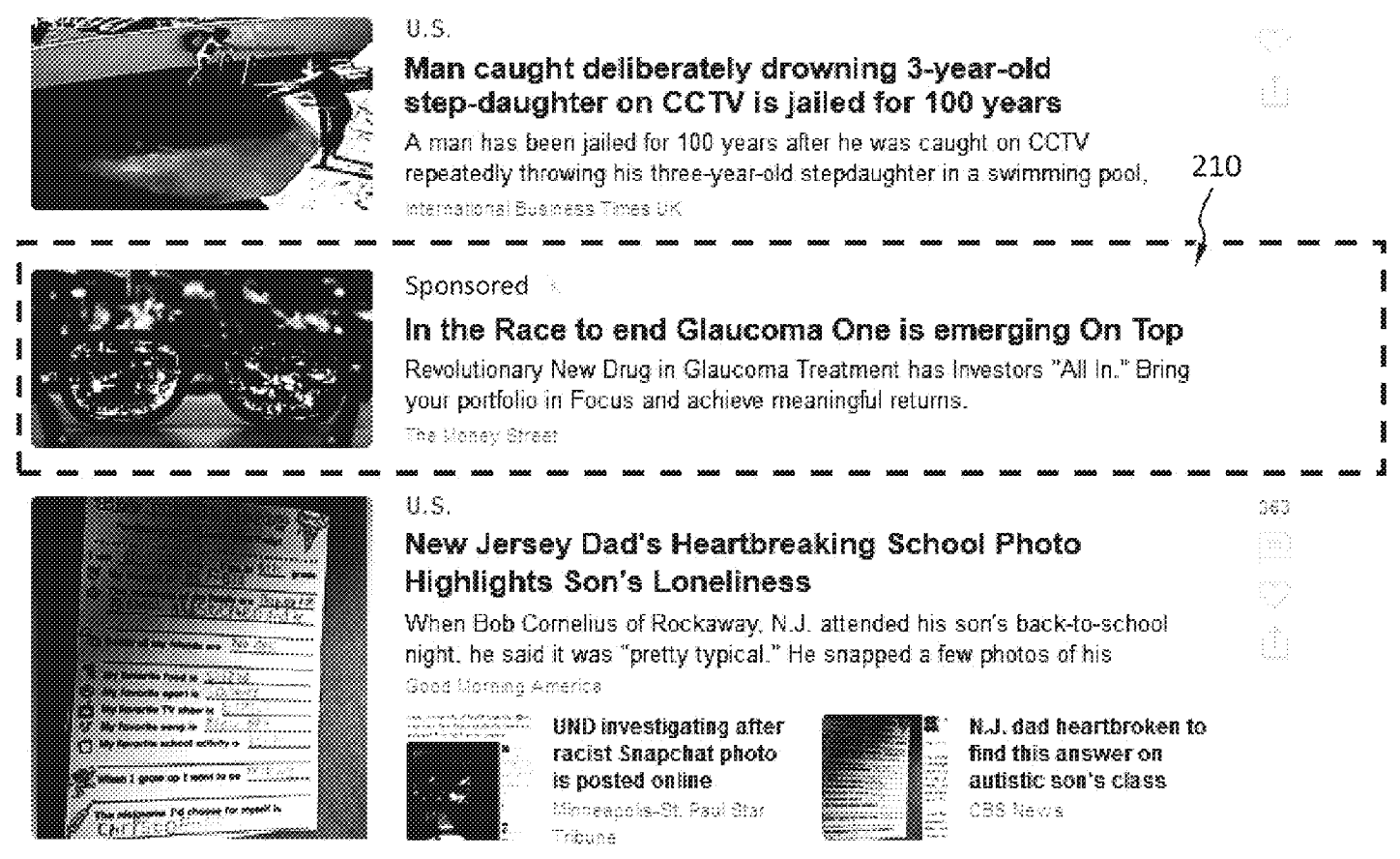

Advertisements in a web page may include a combination of textual contents, image contents and interactive contents. FIG. 2 shows a partial screenshot from a website. An advertisement 210 is highlighted in the dotted box. The advertisement 210 is placed among other non-advertisement contents in the web page. The label "Sponsored" indicates that it is an advertisement. However, not all advertisements are labeled. In this example, the advertisement includes an image and texts.

Figure 3:
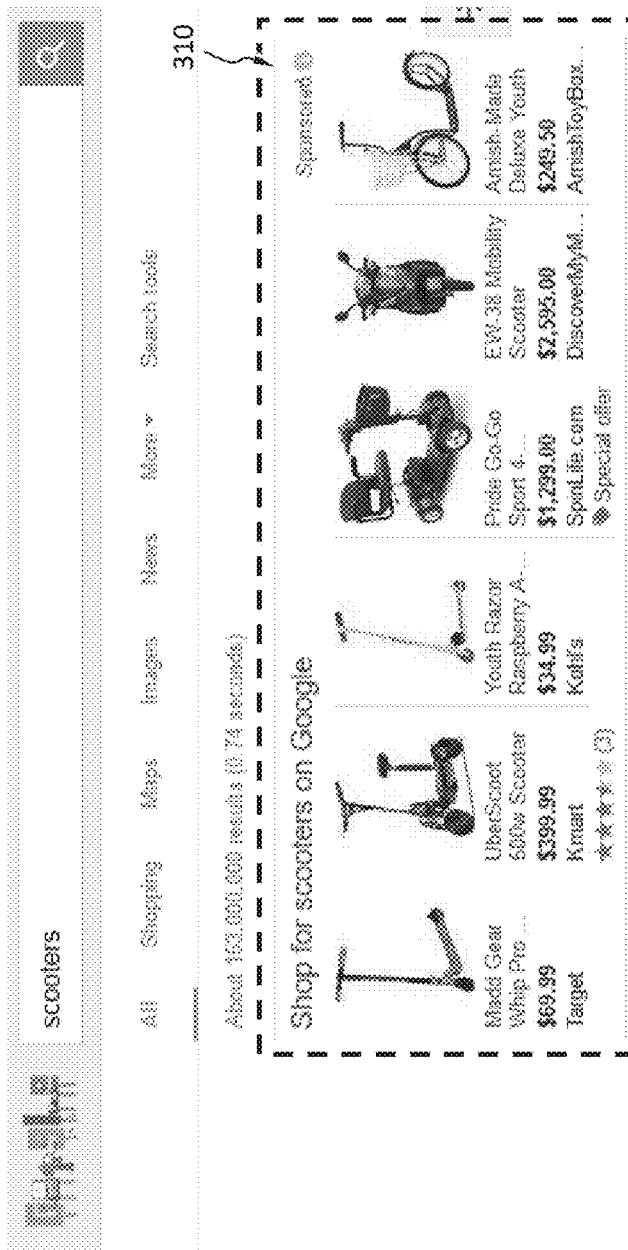
FIG. 3 shows a partial screenshot from a website.

Advertisements in a web page may be placed separately from non-advertisement contents. FIG. 3 shows a partial screenshot from a website. An advertisement 310 is highlighted in the dotted box. The location of the advertisement 310 is clearly separate from the non-advertisement contents in the web page.

Figure 4:
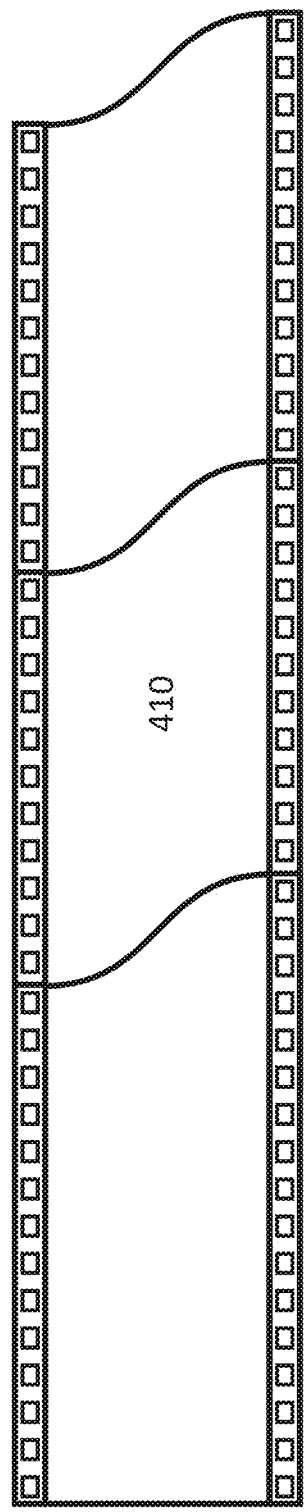
FIG. 4 schematically shows a video stream that has a mid-roll advertisement.

FIG. 4 schematically shows a video stream that has a mid-roll advertisement 410. The mid-roll advertisement 410 is temporally separate from non-advertisement portions of the video stream. An advertisement may also be placed on the images of the video stream. Namely, the advertisement may be spatially separate from non-advertisement portions of the video stream.

Figure 5:
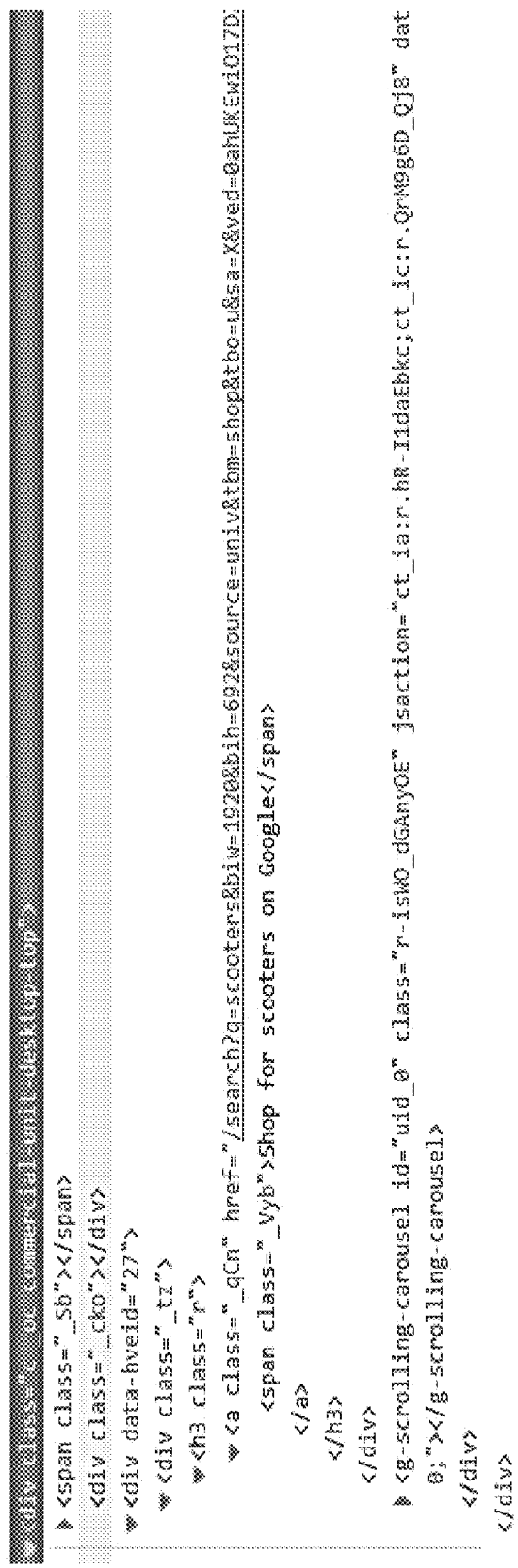
FIG. 5 shows a portion of the Internet communication that, when rendered, produces the advertisement in FIG. 3.

Contents of the Internet communication are usually structured. For example, the Internet communication may include texts written in a markup language file (e.g., HTML file, XML file), texts of executable codes (e.g., in a script language like JavaScript), and texts of structured data (e.g., a JSON). The Internet communication may include binary data of media (e.g., sounds, images and videos). FIG. 5 shows a portion of the Internet communication that, when rendered, produces the advertisement in FIG. 3. It can be observed that the class of the <div> element hints that the contents under the <div> element are advertisements.

The type of the contents (e.g., textual, image or interactive contents), the formats of the contents, the locations of the contents, the time of the contents, the structures of the contents are among the parameters that may be used to identify advertisements in the Internet communication. An example of a method of identifying advertisements will be discussed in more detail below.

Figure 6:
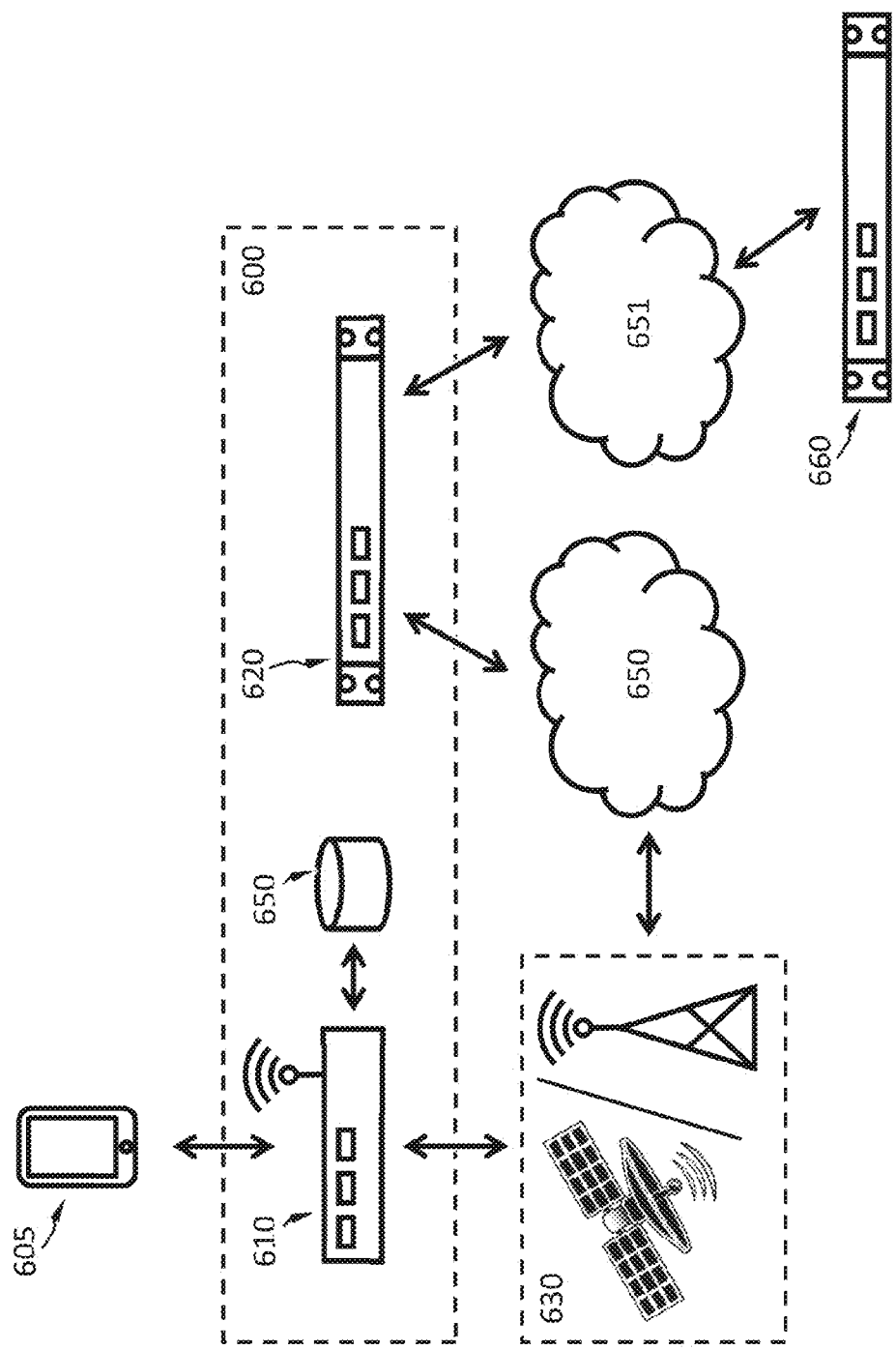
FIG. 6 schematically shows a system for managing advertisement, in particular advertisement in Internet communication with mobile devices (e.g., smart phones and tablets) on a mobile platform (e.g., a bus), according to an embodiment.

FIG. 6 schematically shows a system 600 for managing advertisement, in particular advertisement in Internet communication with mobile devices (e.g., smart phones, tablets, mobile hotspots) on a mobile platform (e.g., a bus). The system 600 comprises a networking device 610, a storage 650 and a proxy server 620.

The networking device 610 is configured to be carried on the mobile platform. The networking device 610 is configured to communicate with a mobile device 605 carried on the mobile platform through a wireless local area network (WLAN) (e.g., a Wi-Fi network), and with a communication infrastructure 630 (e.g., a cellular network or a satellite). The mobile device 605 may be a mobile device a person (e.g., a passenger) brings onto the mobile platform. Examples of the mobile device 605 may include smart phones, tablets, game consoles, and networking devices (e.g., a router designed for travel use). The mobile device 605 may be a fixture on the mobile platform, such as a screen shared by multiple people on the mobile platform.

The networking device 610 is configured to process and transmit data received from the mobile device 605 to the communication infrastructure 630, and configured to process and transmit data received from the communication infrastructure 630 to the mobile device 605. Examples of the networking device 610 may include gateways, routers, network bridges, modems, wireless access points, switches, hubs, and repeaters, proxy servers, firewalls, network address translators, multiplexers, network interface controllers, wireless network interface controllers, etc. The networking device 610 may include one or more cellular modems, or one or more satellite modems. The networking device 610 may be configured to cause data transmitted to the communication infrastructure to be routed to the proxy server 620. Communication between the communication infrastructure 630 and the proxy server 620 may be through a network 650 (e.g., the Internet).

The storage 650 is configured to be carried on the mobile platform. The storage 650 may have advertisements or other contents stored therein. The storage 650 may be part of networking device 610. The storage 650 is configured to provide a content stored therein to the networking device 610 at the request of the networking device 610.

The proxy server 620 is configured to process and transmit data received from the communication infrastructure 630 to a content server 660, and configured to process and transmit data received from the content server 660 to the communication infrastructure 630. Communication between the proxy server 620 and the content server 660 may be through a network 660 (e.g., the Internet). The proxy server 620 may be configured to cause data received from the content server 660 to be routed to the networking device 610. The proxy server 620 may be a physical server or a virtual server. A virtual server is a virtual machine (VM) that responds to requests across a computer network to provide, or help to provide, a network or data service. A VM is an emulation of a computer system. Virtual machines are based on computer architectures and provide functionality of a physical computer. Implementations of VMs may involve specialized hardware, software, or a combination. The proxy server 620 may be located off the mobile platform. The communication between the proxy server 620 and the content server 660 does not have to use a cellular network or a satellite.

The content server 660 is a server that has data requested by the mobile device 605.

Figure 7:
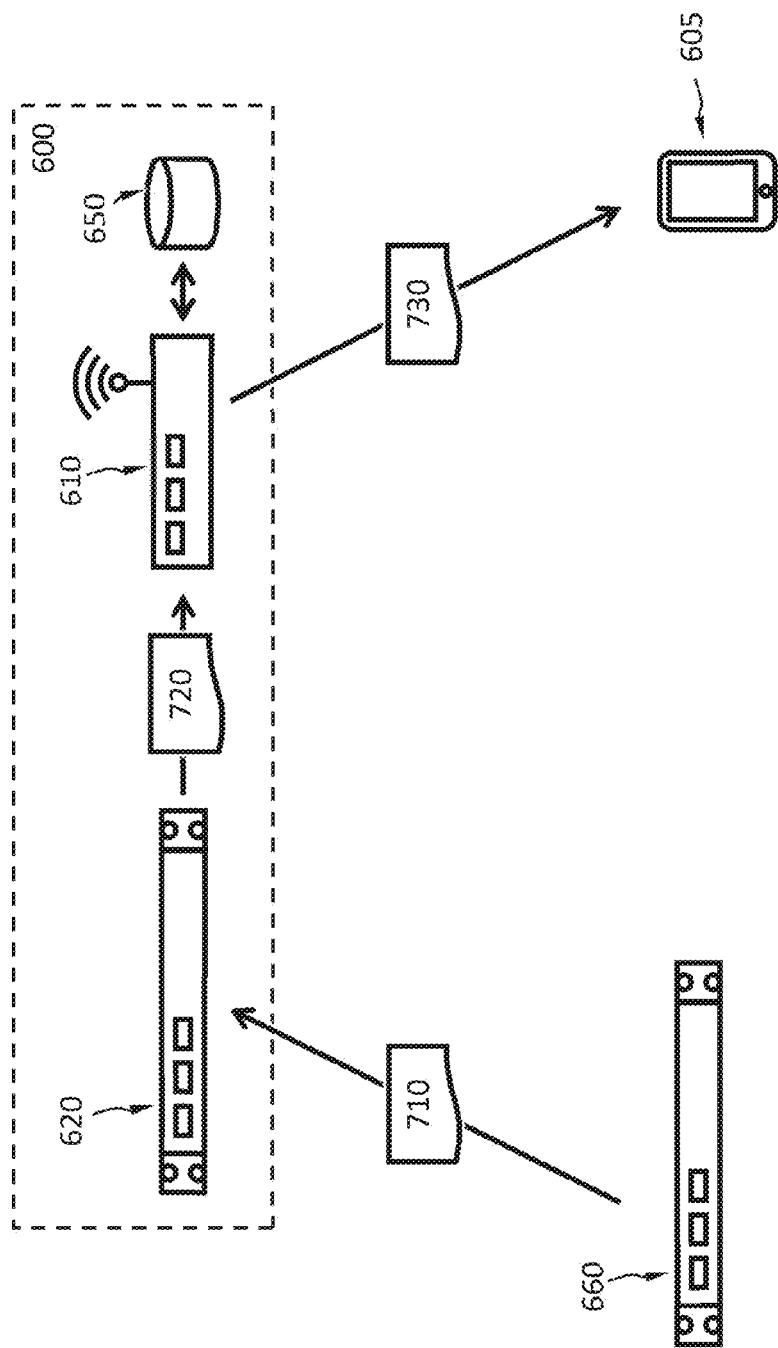
FIG. 7 schematically shows data flow involving the system of FIG. 6.

FIG. 7 schematically shows data flow from the content server 660 to the proxy server 620, from the proxy server 620 to the networking device 610, and from the networking device 610 to the mobile device 605, in response to a request from the mobile device 605. The data 710 sent by the content server 660 and received by the proxy server 620 may include contents not valuable to an operator of the mobile platform, such as advertisements. The proxy server 620 is configured to identify the contents not valuable to the operator. The identification may be based on the address of the content server 660, the type of the contents (e.g., texts, images or interactive contents), the formats of the contents (e.g., JPEG, Flash), spatial locations of the contents, temporal locations of the contents, structures of the data 710 (e.g., HTML tags surrounding the contents), executable codes related to the contents, or a combination thereof. Once the contents not valuable to the operator are identified, the proxy server 620 is configured to modify the data 710 to generate modified data 720 by replacing these contents with labels. The labels are much smaller in size than these contents (several bytes versus kilobytes or more). The labels may represent a variety of characteristics of these contents, such as the subject matters, the spatial locations, the temporal locations, the colors, the spatial sizes, and the temporal sizes. The proxy server 620 is configured to transmit the modified data 720 to the networking device 610. For example, the data 710 may include the HTML code (of a size of almost 92 kilobytes) shown in FIG. 5 and the proxy server 620 may replace all the codes under the tag <div class="c_oc commercial-unit-desktop-top"> with a HTML comment tag including a label (of a size of only several bytes) representing the characteristics of the advertisement 310 in FIG. 3.

The networking device 610 is configured to read the labels in the modified data 720. The networking device 610 is configured to request contents from the storage 650 based on the labels, and to replace the labels with the contents received from the storage 650 to generate data 730 with local contents. For example, the networking device 610 may request content of a similar subject matter as the content whose characteristics a label represents. Using FIG. 3 as an example, the networking device 610 may request an advertisement related to scooters, bicycles, toys and mobility devices from the storage 650, and replace the tag representing the characteristics of the advertisement 310 with the content received from the storage 650. The networking device 610 is configured to transmit the data 730 with contents from the storage 650 to the mobile device 605.

Figure 8:
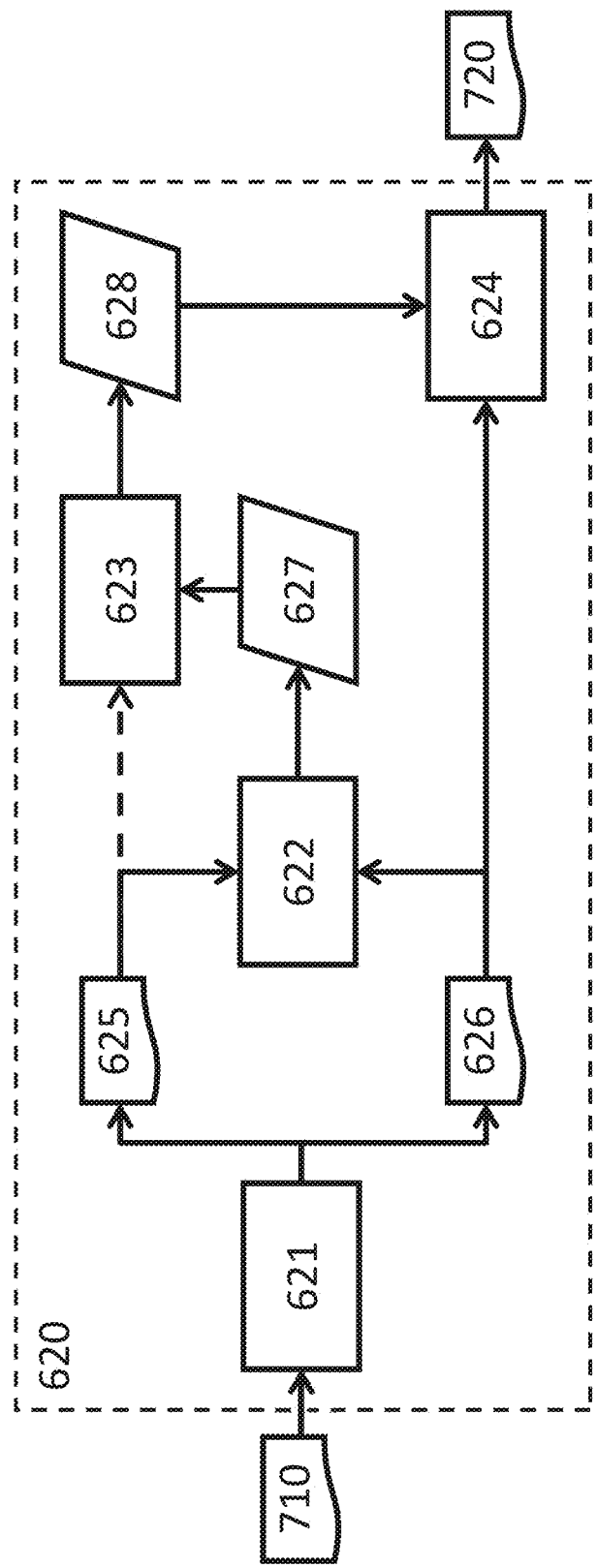
FIG. 8 schematically shows a partial function block diagram of a proxy server.

FIG. 8 schematically shows a partial function block diagram of the proxy server 620. The proxy server 620 comprises a content identification unit 621, a content characteristics determination unit 622, a label generation unit 623, and a label insertion unit 624.

The content identification unit 621 is configured to identify a first group of contents 625 in the data 710 received from the content server 660 (e.g., contents that are not valuable to an operator of the mobile platform, such as advertisements). The rest of the data 710 is a second group of contents 626. The identification may be based on a set of rules and a variety of parameters of the data 710. For example, the parameters may include the address of the content server 660, the type of the contents (e.g., texts, images or interactive contents), the formats of the contents (e.g., JPEG, Flash), spatial locations of the contents, temporal locations of the contents, structures of the data 710 (e.g., HTML tags surrounding the contents), executable codes related to the contents, or a combination thereof. For example, the rules may include a machine learning model (e.g., a classifier). One of the rules may be that contents linked from a certain group of servers are considered not valuable to an operator of the mobile platform. One of the rules may be that contents under certain tags of a markup language are considered not valuable to an operator of the mobile platform. One of the rules may be that if the subject matter of a content is too distinct from the overall subject matter of the data 710, the content is considered not valuable to an operator of the mobile platform.

The content characteristics determination unit 622 receives the first group of contents 625 and the second group of contents 626. The content characteristics determination unit 622 is configured to determined one or more characteristics 627 of the first group of contents 625, based on the first group of contents 625, the second group of contents 626, or a combination thereof.

The label generation unit 623 receives the characteristics 627 and optionally the first group of contents 625. The label generation unit 623 is configured to generate labels 628 that represent the characteristics 627.

The label insertion unit 624 receives the second group of contents 626 and the labels 628. The label insertion unit 624 is configured to combine the second group of contents 626 and the labels 628 to generate the modified data 720.

Figure 9:
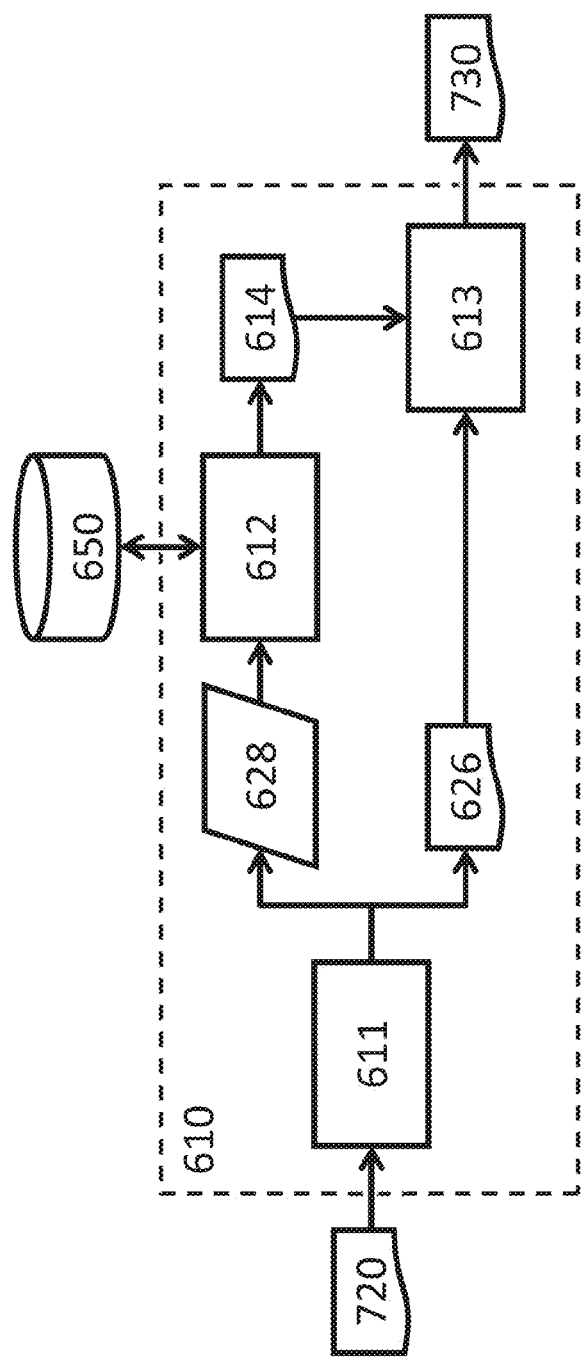
FIG. 9 schematically shows a partial function block diagram of the networking device.

FIG. 9 schematically shows a partial function block diagram of the networking device 610. The networking device 610 comprises a label identification unit 611, a local content retrieval unit 612, and a content insertion unit 613.

The label identification unit 611 receives the modified data 720 from the proxy server 620. The label identification unit 611 is configured to identify the labels 628 in the modified data 720. The rest of the modified data 720 is the second group of contents 626. The labels 628 were previously included into the modified data 720 by the proxy server 620, as explained in FIG. 8.

The local content retrieval unit 612 receives the labels 628 as identified by the labels identification unit 611. The local content retrieval unit 612 is configured to request a third group of contents 614 from the storage 650, based on the labels 628.

The content insertion unit 613 receives the second group of contents 626 and the third group of contents 614. The third group of contents 614 may be local, i.e., being stored on the mobile platform. The content insertion unit 613 is configured to combine the second group of contents 626 and the third group of contents 614 to generate the data 730, and transmit the data 730 to a mobile device.

Figure 10:
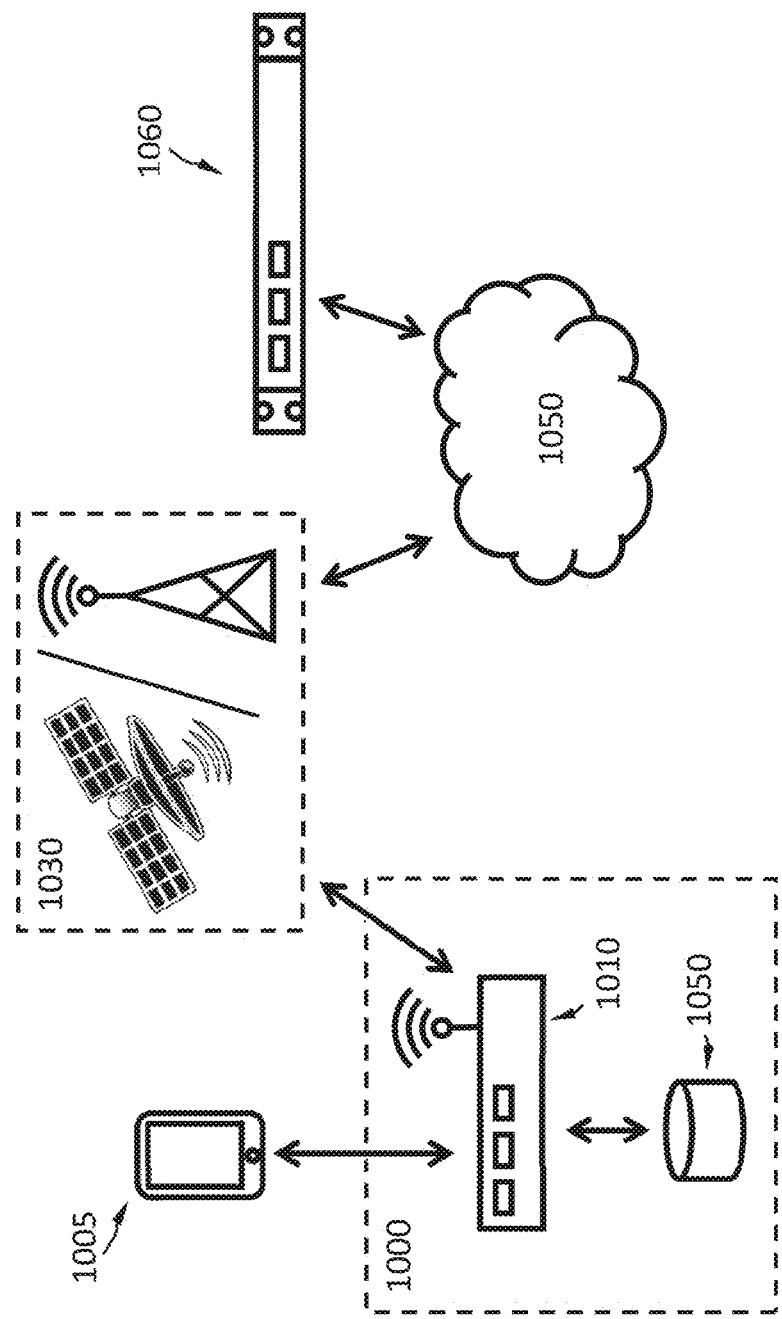
FIG. 10 schematically shows a system for managing advertisement, in particular advertisement in Internet communication with mobile devices (e.g., smart phones and tablets) on a mobile platform (e.g., a bus), according to an embodiment.

FIG. 10 schematically shows a system 1000 for managing advertisement, in particular advertisement in Internet communication with mobile devices (e.g., smart phones and tablets) on a mobile platform (e.g., a bus). The system 1000 comprises a networking device 1010 and a storage 1050.

The networking device 1010 is configured to be carried on the mobile platform. The networking device 1010 is configured to communicate with a mobile device 1005 carried on the mobile platform through a wireless local area network (WLAN) (e.g., a Wi-Fi network), and with a communication infrastructure 1030 (e.g., a cellular network or a satellite). The mobile device 1005 may be a mobile device a person (e.g., a passenger) brings onto the mobile platform. Examples of the mobile device 1005 may include smart phones, tablets, game consoles, and networking devices (e.g., a router designed for travel use). The mobile device 1005 may be a fixture on the mobile platform, such as a screen shared by multiple people on the mobile platform.

The networking device 1010 is configured to process and transmit data received from the mobile device 1005 to the communication infrastructure 1030. Examples of the networking device 1010 may include gateways, routers, network bridges, modems, wireless access points, switches, hubs, and repeaters, proxy servers, firewalls, network address translators, multiplexers, network interface controllers, wireless network interface controllers, etc. The networking device 1010 may include one or more cellular modems, or one or more satellite modems. The communication infrastructure 1030 may communicate with a content server 1060 through a network 1050 (e.g., the Internet).

The storage 1050 is configured to be carried on the mobile platform. The storage 1050 may have advertisements or other contents stored therein. The storage 1050 may be part of networking device 1010. The storage 1050 is configured to provide a content stored therein to the networking device 1010 at the request of the networking device 1010.

The content server 1060 is a server that has data requested by the mobile device 1005.

Figure 11:
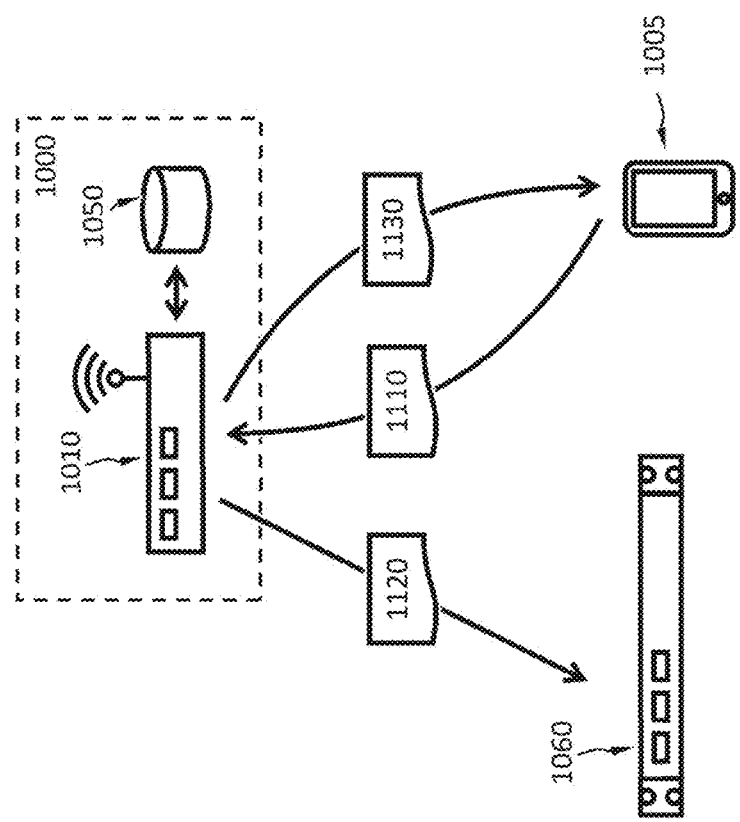
FIG. 11 schematically shows data flow involving the system of FIG. 10.

FIG. 11 schematically shows data flow from the mobile device 1005 to the networking device 1010, and from the networking device 1010 to the content server 1060. The data 1110 sent by the mobile device 1005 may include requests for contents. The requests may be initiated by a human user. For example, when the user types a Uniform Resource Locator (URL) into an address bar of a browser, the user is requesting a default page (e.g., an HTML page or a script language page such as a PHP page) of the URL, which is often referred to as a main or index page. The requests may also be initiated by a content received by the mobile device 1005.

For example, an HTML page may have references to contents (e.g., codes in a script language, images and videos), which may or may not be on the same server with the index page. When a browser renders the HTML page, the browser sends requests for these contents. Some of the requests are for contents not valuable to an operator of the mobile platform, such as advertisements. The networking device 1010 is configured to identify those requests for contents not valuable to the operator. The identification may be based on the address of the contents requested, the type of the contents (e.g., texts, images or interactive contents), the formats of the contents (e.g., JPEG, Flash, codes), spatial locations of the contents, temporal locations of the contents, origin of the requests (e.g., manually typed in by a user or initiated by other contents or applications on the mobile device), or a combination thereof. The networking device 1010 is configured to modify the data 1110 to generate modified data 1120 by modifying or removing the identified requests, and send the modified data 1120 to the content server 1060 through the communication infrastructure 1030 and the network 1050.

The networking device 1010 is configured to determine characteristics of the contents that the identified requests are for, such as the subject matters, the spatial locations, the temporal locations, the colors, the spatial sizes, and the temporal sizes. The networking device 1010 is configured to request contents from the storage 1050 based on the characteristics, and include the contents received from the storage 1050 in data 1130 from the networking device 1010 to the mobile device 1005 to satisfy the identified requests. For example, the networking device 1010 may request a content of a similar subject matter as the content that one of the identified requests is for. The networking device 1010 then transmits the data 1130 with the contents from the storage 1050 to the mobile device 1005.

Figure 12:
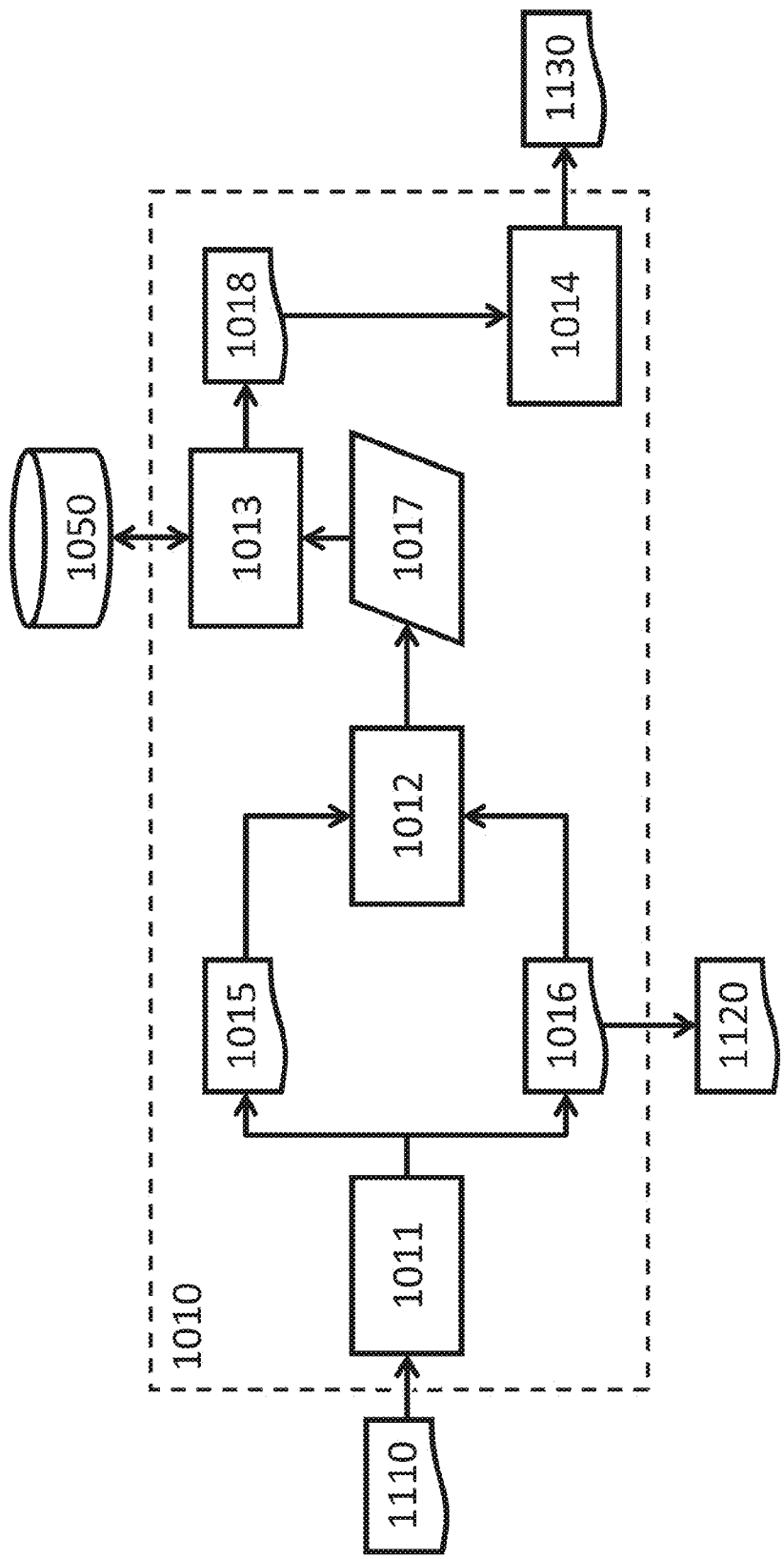
FIG. 12 schematically shows a partial function block diagram of a networking device.

FIG. 12 schematically shows a partial function block diagram of the networking device 1010. The networking device 1010 comprises a request identification unit 1011, a content characteristics determination unit 1012, a local content retrieval unit 1013, and a content insertion unit 1014.

The request identification unit 1011 receives the data 1110 from the mobile device 1005. The request identification unit 1011 is configured to identify a first group of requests 1015 in the data 1110 (e.g., requests for contents that are not valuable to an operator of the mobile platform, such as advertisements). The rest 1016 of the data 1110 may include other requests and other data. The identification may be based on a set of rules and a variety of parameters of the data 1110. For example, the parameters may include the address of the servers hosting the contents being requested, the type of the contents (e.g., texts, images or interactive contents), the formats of the contents (e.g., JPEG, Flash), spatial locations of the contents, temporal locations of the contents, structures of the data 1110 (e.g., HTML tags surrounding the requests), executable codes related to the requests, or a combination thereof. For example, the rules may include a machine learning model (e.g., a classifier). One of the rules may be that all requests for contents on a certain group of servers are considered not valuable to an operator of the mobile platform. One of the rules may be that requests under certain tags of a markup language are considered not valuable to an operator of the mobile platform. One of the rules may be that if the subject matter of a content being requested is too distinct from the overall subject matter of the data 1110, the request is considered not valuable to an operator of the mobile platform.

The content characteristics determination unit 1012 receives the first group 1015 of requests and the rest 1016 of the data 1110. The content characteristics determination unit 1012 is configured to determine characteristics 1017 of the contents that the first group of requests 1015 are for, such as the subject matters, the spatial locations, the temporal locations, the colors, the spatial sizes, and the temporal sizes, based on the first group of requests 1015, the rest 1016 of the data 1110, or a combination thereof.

The local content retrieval unit 1013 receives the characteristics 1017. The local content retrieval unit 1013 is configured to request contents 1018 from the storage 1050 based on the characteristics 1017, where the contents 1018 will satisfy the first group of requests 1015.

The content insertion unit 1014 receives the contents 1018. The content insertion unit 1014 is configured to include the contents 1018 into the data 1130. The networking device 1010 sends the data 1130 to the mobile device 1005.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Figure 13:
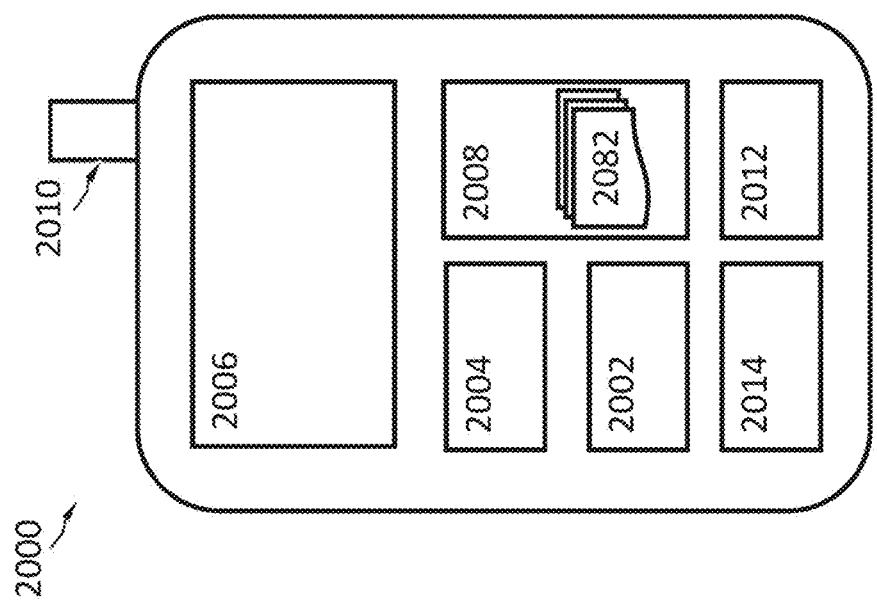
FIG. 13 depicts a functional block diagram of a general hardware device on which the present teaching can be implemented.

FIG. 13 depicts a functional block diagram of a general hardware device 2000 on which the present teaching can be implemented. The general hardware device 2000 may be a general purpose computer or a special purpose computer. The general hardware device 2000 in this example may include any combination of one or more central processing units (CPUs) 2002, one or more graphic processing units (GPUs) 2004, a display 2006, a memory 2008, a communication platform 2010, such as a wireless communication module, storage 2012, and one or more input/output (I/O) devices 2014. Any other suitable component, such as but not limited to a system bus or a controller (not shown), may also be included in the general hardware device 2000. As shown in FIG. 13, one or more applications 2082 may be loaded into the memory 2008 from the storage 2012 in order to be executed by the CPU 2002. The applications 2082 may be executed on various operating systems, e.g., Linux. Execution of the applications 2082 may cause the general hardware device 2000 to perform the functions as described above.

Figure 14:
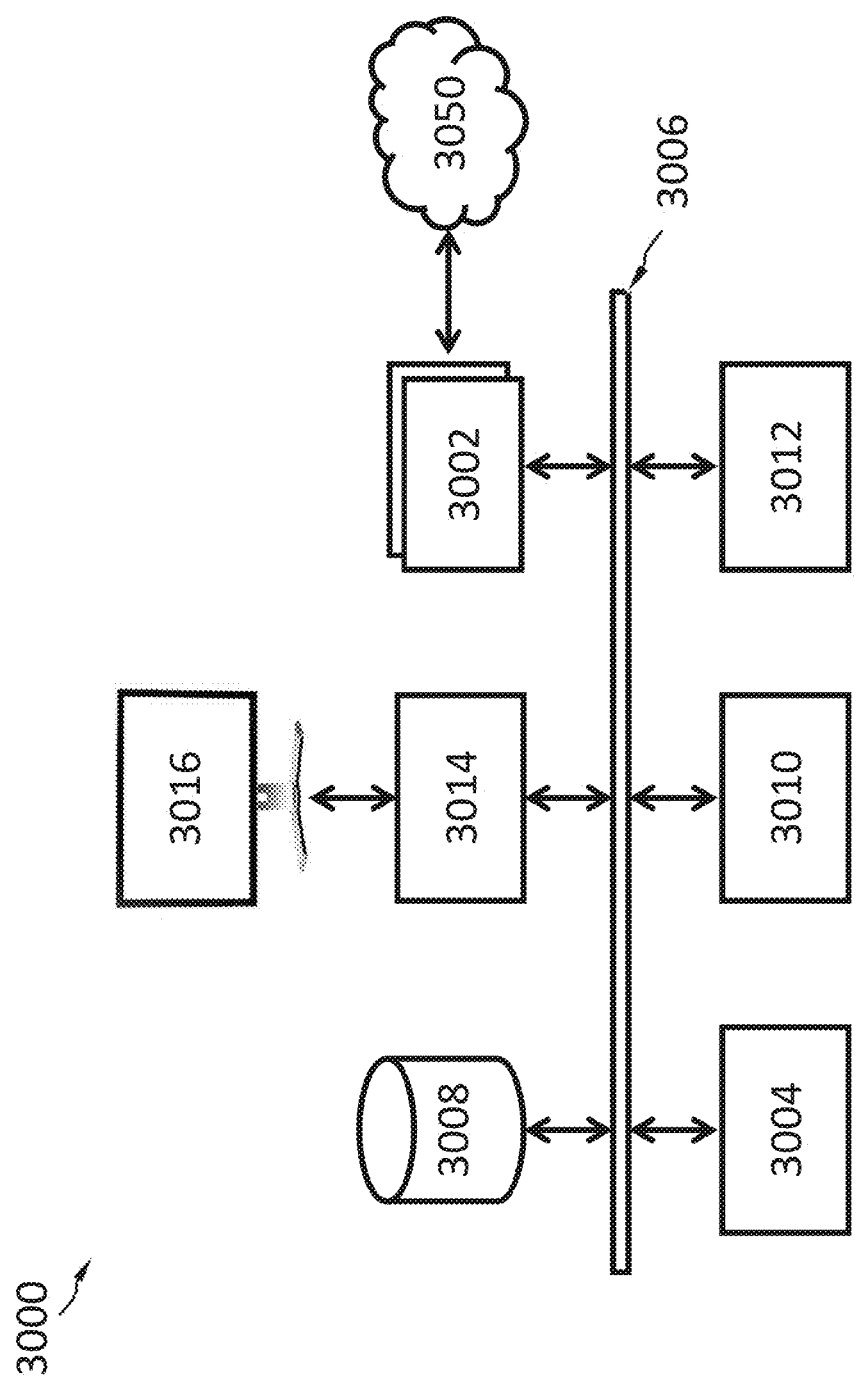
FIG. 14 depicts a general computer architecture on which the present teaching can be implemented and has a functional block diagram illustration of a computer hardware platform which includes user interface elements.

FIG. 14 depicts a general computer architecture on which the present teaching can be implemented and has a functional block diagram illustration of a computer hardware platform which includes user interface elements. The computer may be a general-purpose computer or a special purpose computer. This computer 3000 can be used to implement any components (e.g., the networking devices 610 and 1010, and the proxy server 620) of the system and components described herein, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 3000, for example, includes COM ports 3002 connected to and from a network 3050 connected thereto to facilitate data communications. The computer 3000 also includes a central processing unit (CPU) 3004, in the form of one or more processors, for executing program instructions. The exemplary computer platform includes an internal communication bus 3006, program storage and data storage of different forms, e.g., disk 3008, read only memory (ROM) 3010, or random access memory (RAM) 3012, for various data files to be processed and/or communicated by the computer, as well as possibly program instructions to be executed by the CPU. The computer 3000 also includes an I/O component 3014, supporting input/output flows between the computer and other components therein such as user interface elements 3016. The computer 3000 may also receive programming and data via network communications.

Hence, aspects of the functions disclosed herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teaching is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present teaching, it will be understood that various additions, modifications, and substitutions may be made therein without departing from the spirit and scope of the principles of the present teaching as defined in the accompanying claims. One skilled in the art will appreciate that the present teaching may be used with many modifications of form, structure, arrangement, proportions, materials, elements, and components and otherwise, used in the practice of the disclosure, which are particularly adapted to specific environments and operative requirements without departing from the principles of the present teaching. The presently disclosed embodiments are therefore to be considered in all respects as illustrative and not restrictive, the scope of the present teaching being indicated by the appended claims and their legal equivalents, and not limited to the foregoing description.

What is claimed is:

1. A system comprising:
a networking device,
a storage, and
a proxy server,
wherein the proxy server is configured to identify a first group of contents from first data received from a content server, to modify the first data to generate second data by replacing the first group of contents with labels, and to transmit the second data to the networking device;
wherein the networking device is configured to read the labels in the second data, to request contents from the storage based on the labels, to replace the labels with the contents received from the storage to generate third data, to transmit the third data to a mobile device;
wherein the first group of contents comprise media data.

2. The system of claim 1, wherein the mobile device and the networking device are on a same mobile platform.

3. The system of claim 2, wherein the mobile platform is a bus.

4. The system of claim 1, wherein the mobile device is selected from a group consisting of a smart phone, a tablet, a game console, a mobile hotspot, another networking device, and a fixture on a mobile platform.

5. The system of claim 1, wherein the networking device is selected from a group consisting of gateways, routers, network bridges, modems, wireless access points, switches, hubs, and repeaters, proxy servers, firewalls, network address translators, multiplexers, network interface controllers, wireless network interface controller and a combination thereof.

6. The system of claim 1, wherein the networking device is configured to communicate with the mobile device through a wireless local area network (WLAN).

7. The system of claim 1, wherein the networking device comprises one or more cellular modems, or one or more satellite modems.

8. The system of claim 1, wherein the networking device is configured to communicate with a communication infrastructure.

9. The system of claim 8, wherein the communication infrastructure comprises a cellular network or a satellite.

10. The system of claim 8, wherein the networking device is configured to cause data transmitted to the communication infrastructure to be routed to the proxy server.

11. The system of claim 1, wherein the storage is configured to provide a content stored therein to the networking device at a request of the networking device.

12. The system of claim 1, wherein the proxy server is configured to cause data received from a content server to be routed to the networking device.

13. The system of claim 1, wherein the proxy server is configured to identify the first group of contents based on parameters selected in a group consisting of an address of a content server, a type of the contents, formats of the contents, spatial locations of the contents, temporal locations of the contents, structures of the first data, executable codes related to the contents, and a combination thereof.

14. The system of claim 1, wherein the labels are smaller in size than the first group of contents.

15. The system of claim 1, wherein the labels represent characteristics of the first group of contents, the characteristics selected from a group consisting of subject matters of the first group of contents, spatial locations of the first group of contents, temporal locations of the first group of contents, colors of the first group of contents, spatial sizes of the first group of contents, temporal sizes of the first group of contents, and a combination thereof.

16. A networking device comprising:
a label identification unit, a local content retrieval unit, and a content insertion unit, wherein the label identification unit, the local content retrieval unit and the content insertion unit comprise one or more processors;

wherein the label identification unit is configured to identify labels that represent a first group of contents, separate from a second group of contents, in data received by the networking device;

wherein the local content retrieval unit is configured to request a third group of contents from a storage, based on the labels;

wherein the content insertion unit is configured to combine the second group of contents and the third group of contents to generate other data, and to transmit the other data to a mobile device;

wherein the first group of contents comprise media data.

17. The networking device of claim 16, wherein the storage and the networking device are on a same mobile platform.

18. The networking device of claim 17, wherein the mobile platform is a bus.

\* \* \* \* \*